United States Patent [19]
Robinson

[11] Patent Number: 5,154,833
[45] Date of Patent: Oct. 13, 1992

[54] REMOVAL OF MERCURY FROM WASTE STREAMS

[75] Inventor: James M. Robinson, Saylorsburg, Pa.

[73] Assignee: Connaught Laboratories Inc., Swiftwater, Pa.

[21] Appl. No.: 818,086

[22] Filed: Jan. 8, 1992

[51] Int. Cl.$^5$ .............................. C02F 1/28; C02F 9/00
[52] U.S. Cl. .................................... 210/664; 210/668; 210/669; 210/688; 210/914
[58] Field of Search ............... 210/664, 668, 669, 688, 210/914

[56] References Cited

U.S. PATENT DOCUMENTS

| | | | |
|---|---|---|---|
| 3,617,563 | 11/1971 | Fuxelius | 210/688 |
| 3,755,161 | 8/1973 | Yokota et al. | 210/914 |
| 3,873,581 | 3/1975 | Fitzpatrick et al. | 210/688 |
| 3,935,098 | 1/1976 | Oda et al. | 210/688 |

Primary Examiner—Ivars Cintins
Attorney, Agent, or Firm—Shoemaker & Mattare Ltd.

[57] ABSTRACT

Thimerosal is removed from aqueous effluent streams from vaccine production to provide an invironmentally-acceptable effluent stream. The thimerosal first is converted to ionic form by chlorination, the resulting solution is dechlorinated to remove dissolved unreacted chlorine, and then the ionic mercury is removed by ion-exchange employing thiol groups.

15 Claims, 1 Drawing Sheet

REMOVAL OF MERCURY FROM WASTE STREAMS

FIELD OF INVENTION

The present invention relates to the removal of mercury from waste streams, particularly organic mercury.

BACKGROUND TO THE INVENTION

Thimerosal is an organic mercury compound of the formula:

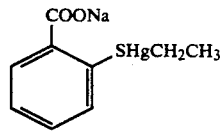

This compound is used as a bacteriostatic agent or preservative in certain biological vaccines, as well as intermediates, buffers, diluents and cleaning and disinfecting reagents used in the manufacture of vaccines, and also as an inactivating agent for certain whole cell vaccine materials, and, as a result, is present in small quantities in effluent streams from vaccine manufacture. The primary contributors to the thimerosal concentration in the effluent are discarded whole cell supernatant and unused buffers. Although such effluent streams contain only small quantities of such organic mercury compound, in the 100's ppm range, such quantity is unacceptably high for disposal by simple sewering or other discharge to water bodies. Environmental regulation requires that the quantity of mercury discharged be less than 3 ppb.

Dilution of the effluent stream is not a practical alternative in view of the roughly 10,000 fold decrease in quantity of organic mercury required. Prior to the present invention, the applicant was unaware of any proposal which would decrease organic mercury levels in vaccine manufacture effluent streams to environmentally-acceptable acceptable levels, and which could accomplish the same in an efficient and inexpensive manner.

SUMMARY OF INVENTION

In accordance with the present invention, there is provided a method of removing thimerosal substantially completely from an aqueous effluent stream from vaccine manufacture to below environmentally-acceptable levels. The procedure involves a three-step operation, namely:

(a) effecting chlorination of the aqueous effluent stream under conditions to convert the thimerosal to ionic form, particularly by oxidation with sodium hypochlorite, (b) removing any dissolved unreacted chlorine usually in the form of sodium hypochlorite, from the resulting aqueous solution of ionic mercury compound, and (c) contacting the aqueous solution of ionic mercury compound with a material having pendant thiol groups, preferably a column of resin beads, to effect reaction of the ionic mercury with the pendant thiol groups to remove ionic mercury from the aqueous solution.

GENERAL DESCRIPTION OF INVENTION

Figure 1:
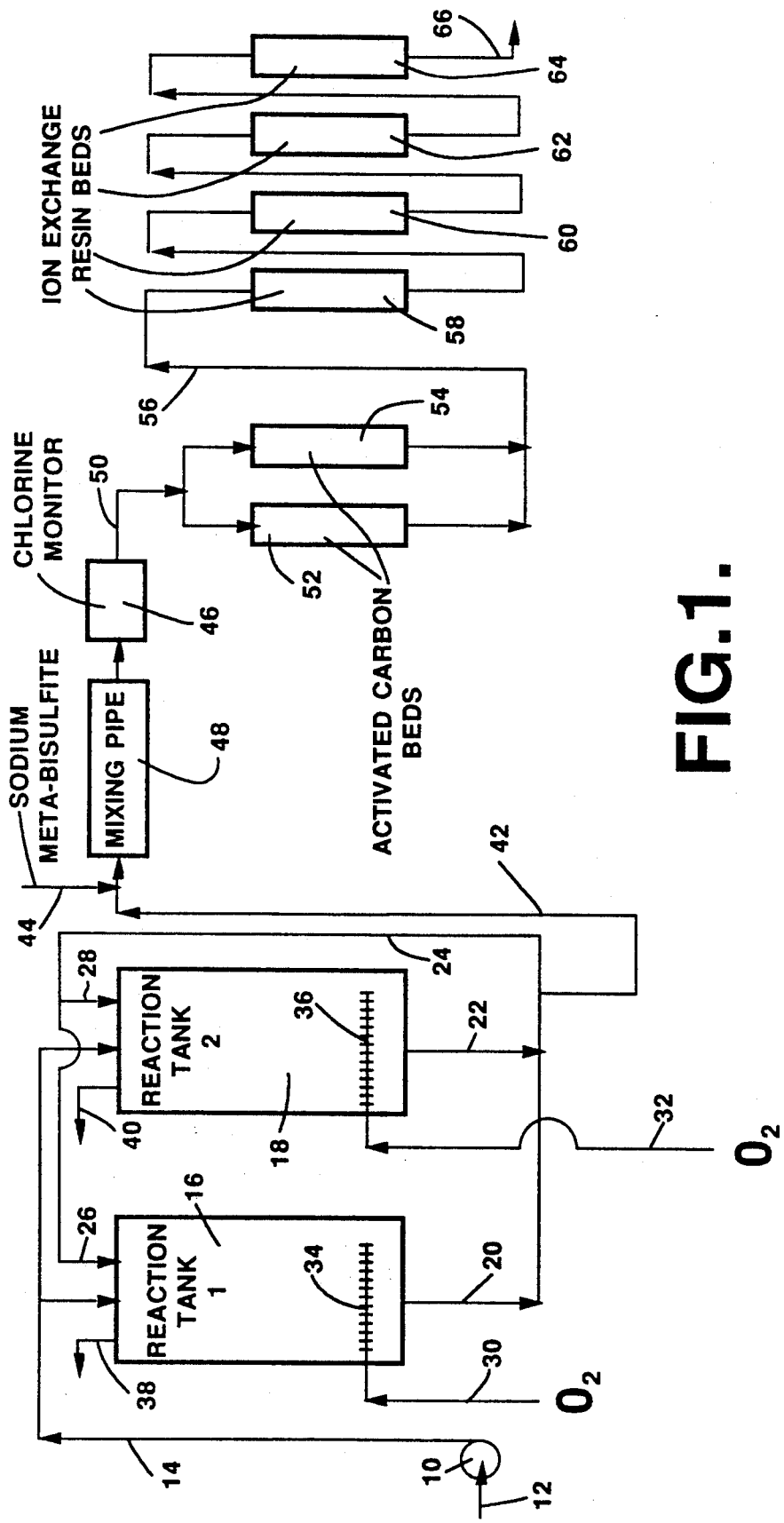
FIG. 1 is a schematic flow sheet of a thimerosal removing process in accordance with one embodiment of the invention.

The first step in removing the thimerosal from the aqueous stream is to oxidize the organic mercury compound, preferably with sodium hypochlorite, to an ionic form, namely an $Hg+$ salt form. Such oxidation is effected by contacting the effluent stream with sodium hypochlorite or other source of active chlorine under suitable pH conditions conducive to such oxidation, generally less than about pH 3, preferably about pH 2.0 to about pH 3.0, for a time sufficient to convert all the organic mercury compound present in the effluent stream to ionic form, generally at least about 2 hours, preferably about 2 to about 4 hours. Such oxidation usually is effected at an ambient temperature (about 20° to 25° C.), although temperatures from about 5 to about 75° C. may be employed. The absence of residual unconverted organic mercury compounds in the effluent stream is determined by an atomic adsorption test for total mercury content.

The second step involves dechlorination of the oxidized stream containing ionic mercury compound to remove dissolved unreacted chlorine, which is generally present as sodium hypochlorite. This step is necessary since the resins employed in the subsequent ion-exchange operation are sensitive to absorption and oxidation by chlorine. Hence, if the residual chlorine were not removed, the active life of the resin material would be decreased, thereby significantly increasing costs.

The dechlorination procedure preferably involves a three step operation. In a first step, the oxidized stream is aerated by passing air through the oxidized stream to strip chlorine gas from the oxidized stream. Such air stripping operation is effected generally until no further chlorine can be removed in this way. Generally, such air stripping operation is effected for about 8 to about 20 hours, preferably about 12 to about 20 hours. The air stripping usually is effected at ambient temperatures (about 20° to 25° C.), although the temperature may generally range from about 5° to about 70° C. The air stripping operation generally is successful in decreasing the dissolved chlorine concentration to ppm levels.

It is not possible to remove all the chlorine from the oxidized solution by aeration in view of an affinity that the chlorine has for water, providing hypochlorite ions, and further processing is required. A second chlorine-removal step involves reaction of the air-stripped solution with sodium bisulfite. Such reaction is effected by mixing an aqueous solution of sodium bisulfite with the air stripped solution and is added on-line while the air-stripped solution is forwarded to the resin beds. The quantity of sodium bisulfite employed generally is about 50 ppm to about 150 ppm. The level of sodium bisulfite added is varied depending on the residual hypochlorite concentration. An on-line chlorine monitor preferably is employed to indicate the extent of residual chlorine and hence the sodium bisulfite requirement stoichiometrically to remove the residual chlorine. If the air stripping oxidation is sufficiently efficient, little or no sodium bisulfite addition may be necessary. The sodium bisulfite binds with the residual dissolved chlorine, present in the form of hypochlorite.

The solution resulting from the sodium bisulfite treatment is contacted with activated carbon as the third chlorine-removal step, generally by flowing the solution through a packed column of activated carbon, which results in adsorption of the sodium bisulfitebound hypochlorite to the activated carbon.

While the chemical treatment with sodium bisulfite and contact with activated carbon themselves are capable of removing all the dissolved unreacted chlorine from the oxidized solution, it is preferred to effect the initial air stripping operation described above to decrease the requirement for chemicals and to prolong the life of the activated carbon, thereby realizing a saving in operating costs.

The chlorine-removal operation is designed to remove all the unreacted chlorine contained in the aqueous ionic mercury solution prior to further processing.

As the third step of the overall process, the chlorine-free aqueous solution of ionic mercury compound next is subjected to an ion-exchange operation whereby the ionic mercury compound is removed from the aqueous solution. This step is effected by contacting the chlorine-free solution with a substance having pendant thiol (—SH) groups, usually in the form of a bed of resin beads. One suitable material comprises a cross-linked polystyrene matrix with thiol functionality. The thiol groups undergo ion-exchange with the ionic mercury compound and form a strong mercury-sulfur covalent bond, thereby effectively removing the mercury from the aqueous phase.

Depending on the amount of ionic mercury to be removed, the size of the column of ion-exchange material which contacts the aqueous solution and the density of pendant thiol groups on the resin, it may be necessary to pass the aqueous medium through a plurality of columns arranged in series flow in order to decrease the residual mercury concentration below the desired value, typically below 3 ppb.

When the ion-exchange resin becomes depleted and no longer effectively removes mercury from the aqueous phase, the ion-exchange resin may be disposed of by incineration, with mercury vapor being removed from the stack gases by conventional technology.

DESCRIPTION OF PREFERRED EMBODIMENT

Referring to FIG. 1, a thimerosal effluent stream is mixed with sodium hypochlorite solution to provide an aqueous mixture having the desired pH conditions and the mixture is pumped by pump 10 through lines 12 and 14 to a pair of parallel reaction tanks 16 and 18. The mixture is recirculated within the reaction tanks 16 and 18 during the hypochlorite reaction period by withdrawal of mixture from the tanks 16 and 18 respectively by lines 20 and 22, recycle by line 24 and refeed by lines 24 and 26 respectively.

Once the reaction time for sodium hypochlorite reaction is complete, the aqueous reaction product is aerated by air or oxygen fed by lines 30 and 32 respectively to reaction tanks 16 and 18 and distributed in the reaction tanks 16 and 18 by spargers 34 and 36. A chlorine-containing gas stream is vented from each of the reaction tanks 16 and 18 by lines 38 and 40 respectively.

When aeration is complete, the oxidized liquid is removed from the tanks 16 and 18 by lines 20 and 22 and a combined stream is formed in line 42. Once the reaction tanks 16 and 18 are empty of oxidized solution, a new batch of aqueous mixture of thimerosal-containing solution and sodium hypochlorite may be fed to the tanks 16 and 18 for reaction and subsequent oxidation.

An aqueous solution of sodium metabisulfite is added to the stream in line 42 by line 44 in an amount stoichiometric to the amount of residual chlorine determined by an on-line chlorine monitor 46. The mixture of sodium bisulfite and oxidized stream passes through a mixing pipe 48 to ensure thorough mixing of the aqueous media and reaction of sodium bisulfite and residual sodium hypochlorite.

Downstream of the chlorine monitor 46, the mixed aqueous solution passes by line 50 to a pair of parallel feed columns 52, 54 of activated carbon, which serve to adsorb sodium bisulfite bound sodium hypochlorite from the aqueous medium.

The sodium hypochlorite-free solution of ionic mercury existing the activated carbon beds 52, 54 is forwarded by line 56 to series-connected ion exchange resin columns 58, 60, 62 and 64. Each of the ion-exchange resin columns contains a bed of resin beads containing pendant thiol groups, which removes the ionic mercury from the aqueous solution by ion exchange. The substantially mercury-free aqueous solution is discharged from the last of the series-linked ionexchange resin beds by line 66.

EXAMPLE

The arrangement illustrated in FIG. 1 was set up and a series of experiments was performed on an aqueous solution of thimerosal obtained as a by-product of vaccine production, arising as noted above, containing approximately 100 ppm of mercury. The carbon and resin beds were unchanged during the course of the series of experiments. The mercury concentration was determined at various locations in the operation.

The results obtained are summarized in the following Table 1:

TABLE I

| Run No. | Total Vol (gal) | Quantity HOCl[1] | Mercury Concentration | | |
|---|---|---|---|---|---|
| | | | After bed 58 | After bed 60 | Final Effluent |
| 1 | 450 | 500% | | | nd[2] |
| 2 | 450 | 200% | 0.2 ppb | | nd |
| 3 | 450 | 100% | | | >2 ppb |
| 4 | 450 | 125% | | | >2 ppb |
| 5 | 450 | 150% | >2 ppb | | nd |
| 6 | 900 | 150% | | | nd |
| 7 | 900 | 150% | | | >2 ppb |
| 8 | 900 | 150% | | | >2 ppb |
| 9 | 900 | 150% | 14 ppm | 20 ppb | 3 ppb |

Notes:
1. % of equivalent molar quantity of mercury.
2. nd = not detected.

These results show an efficient removal of thimerosal from 100 ppm Hg levels to a not-detectable or very low level in the final effluent. In run 9, the resin beds are becoming exhausted and need replacing to maintain an effluent discharge below 3ppb Hg.

SUMMARY OF DISCLOSURE

In summary of this disclosure, the present invention provides a novel method to effect removal of thimerosal from aqueous effluent streams from vaccine production which is particularly effective in decreasing the residual mercury concentration below environmentally-acceptable values and which is inexpensive to operate. Modifications are possible within the scope of this invention.

What I claim is:

1. A process for the removal of thimerosal from an aqueous effluent stream from vaccine manufacture, which comprises:
   (a) effecting chlorination of said aqueous effluent stream under conditions to convert said thimerosal to ionic form, thereby forming an aqueous solution of ionic mercury compound,
   (b) removing any dissolved unreacted chlorine from the aqueous solution of ionic mercury compound, and
   (c) contacting said aqueous solution of ionic mercury compound with a substance having pendant thiol ups to effect reaction of the ionic mercury compound with said pendant thiol groups to remove the ionic mercury compound from the aqueous solution.

2. The process of claim 1 wherein said chlorination is effected using aqueous sodium hypochlorite solution.

3. The process of claim 2 wherein said chlorination is effected at a pH of less than about 3.

4. The process of claim 3 wherein said chlorination is effected for at least about 2 hours.

5. The process of claim 1 wherein said chlorination is effected at a temperature of about 5° to about 75° C.

6. The process of claim 5 wherein said removal of unreacted chlorine from the aqueous solution of ionic mercury compound is effected by:
   (a) air stripping the aqueous solution for about 8 to about 20 hours at a temperature of about 5° to about 70° C. to form an air stripped solution,
   (b) reacting the air stripped solution with bisulfate ions to form a reacted solution, and
   (c) contacting the reacted solution with activated carbon to remove any remaining unreacted chlorine.

7. The method of claim 6 wherein said aeration step is effected at a temperature of about 20° to 25° C. for about 12 to about 20 hours.

8. The method of claim 7 wherein said bisulfite ions are added in the form of so metabisulfite.

9. The method of claim 8 wherein the concentration of residual chlorine contained in said air stripped solution is determined and the quantity of sodium metabisulfite added is correlated stoichiometrically to the determined residual concentration.

10. The method of claim 9 wherein the amount of sodium metabisulfite added is about 50 to about 150 ppm.

11. The method of claim 9 wherein said substance having pendant thiol groups comprises at least one column of resin beads bearing such pendant thiol groups.

12. The method of claim 11 wherein said contact of said aqueous solution of ionic mercury compound with said at least one column of resin beads is effected until an aqueous effluent stream is provided having a residual mercury content less than about 3 ppb.

13. The process of claim 2 wherein said chlorination is effected at a pH of about 2.0 to about 3.0.

14. The process of claim 13 wherein said chlorination is effected for about 2 to about 4 hours.

15. The process of claim 14 wherein said chlorination is effected at a temperature of about 20° to 25° C.

* * * * *